Dec. 15, 1931.   N. F. KEMPEL   1,836,327
VEHICLE BRAKE
Filed Oct. 14, 1927    2 Sheets-Sheet 1
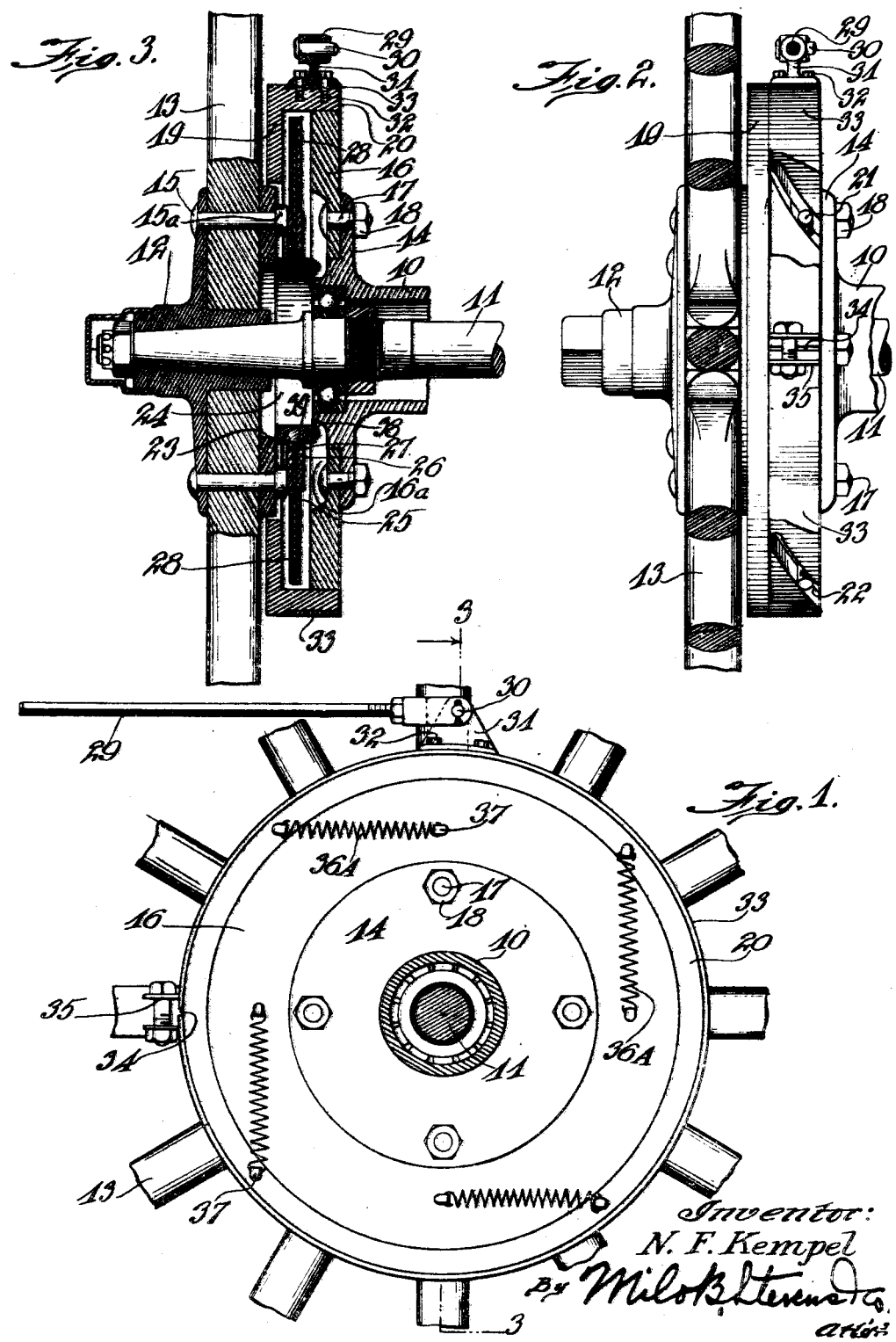

Dec. 15, 1931.          N. F. KEMPEL          1,836,327
                        VEHICLE BRAKE
                    Filed Oct. 14, 1927       2 Sheets-Sheet 2
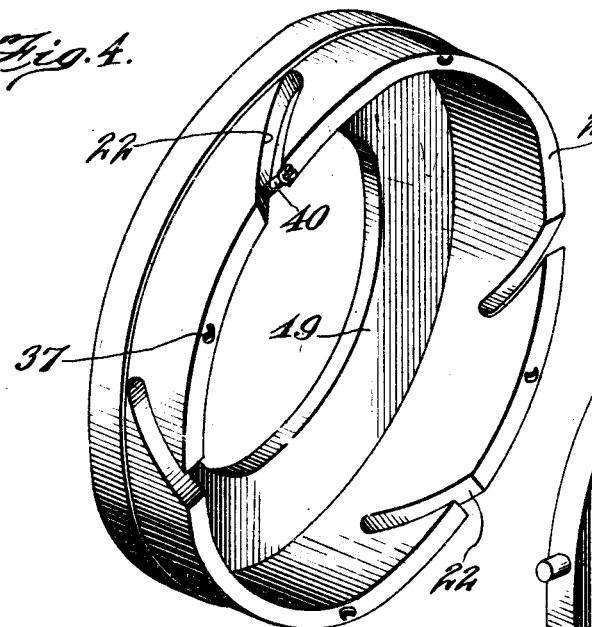
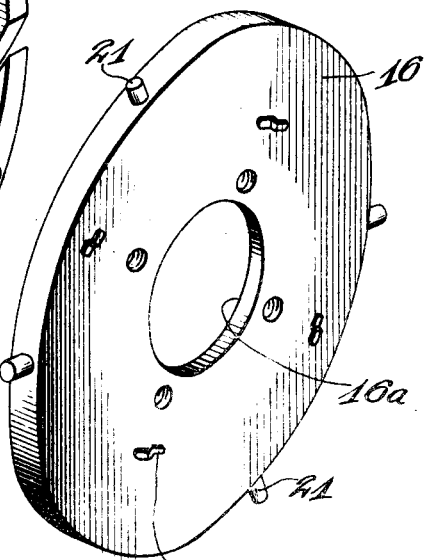
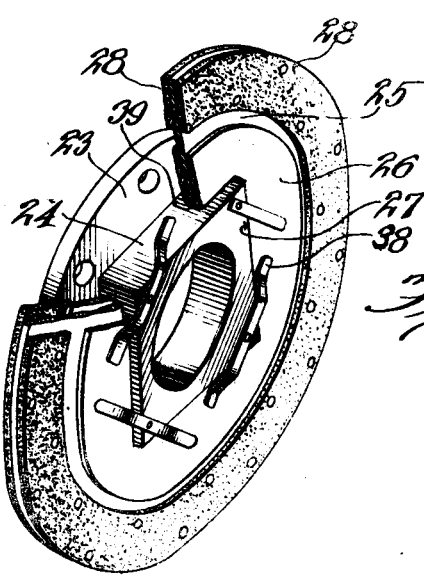
Inventor:
N. F. Kempel Patented Dec. 15, 1931

1,836,327

UNITED STATES PATENT OFFICE

NORBERT F. KEMPEL, OF CHICAGO, ILLINOIS

VEHICLE BRAKE

Application filed October 14, 1927. Serial No. 226,208.

My invention relates to vehicle brakes, and more particularly to brakes used on automobiles and the like, and my main object is to provide a brake which is dependable in operation.

A further object of my invention is to design a brake which is compact and occupies considerable less room than the prevailing types.

A still further object of the invention is to apply the principle of friction disks to the braking action, whereby to secure a great active surface with the use of a minimum of material and space.

Another object of my invention is to produce a brake which is self-adjusting and takes up its own wear without attention or renewal for a long period.

An important object of my novel brake is to construct the same of easily interchangeable and accessible parts, so that a repair or replacement will reduce itself to the sphere of ordinary garage service.

A final but nevertheless vital object of the invention is to design the same with few and simple parts, in order that it may be produced at low cost and handled without difficulty.

With the above objects in view and any others that may suggest themselves from the specification and claims to follow, a better understanding of the invention may be had by reference to the accompanying drawings, in which—

Figure 1 is an elevation of the novel brake as applied to a motor car axle and wheel; these parts being shown sectionally and the view being taken in an outward direction;

Fig. 2 is an edge view from the left of the showing in Figure 1, partly broken away;

Fig. 3 is a vertical section of the assembly, as taken on line 3—3 of Figure 1;

Fig. 4 is a perspective view of the driving element of the brake;

Fig. 5 is a perspective view of the affected element, partly in section; and

Fig. 6 is a perspective view of the stationary element of the brake.

It is a familiar fact that the existing types of brakes on motor cars are more or less inefficient because of the short duration of their adjustments. The adjustments are of a relatively delicate character, and require considerable skill in order that the brake may be disposed freely of the wheel when not in action, yet grip the same gradually and evenly when applied. The application of the common brake is rarely uniform, and is for that reason often attended by undue wear and noise. Also, the quick or sudden application of the brake causes the same to lock in some instances, placing the machine out of the control of the driver and often resulting in accidents. Further, the delicate adjustment of the brakes requires the frequent repair thereof, putting the owner to repeated expense and loss of time as well as reducing the factor of safety because of apprehension as to the condition of the brakes during the use of the machine. My novel brake has been designed to overcome the above objections, and to provide a structure which attains the objects contemplated in an efficient manner.

To describe the novel brake in detail by reference to the accompanying drawings, I have illustrated a typical axle and wheel structure, the axle being denoted by 10, the axle-shaft by 11, the wheel hub by 12, and the spokes by 13. The axle 10 is formed with the usual end-flange 14, and the wheel hub 12 receives the bolts 15 for the spokes which are headed to provide the stops 15a.

In applying the novel brake, I first fit a base ring 16 to the axle flange 14 in the same manner as the customary spider flange is fitted for the standard brake installation, bolts 17 and nuts 18 being applied in the present instance to secure the ring to the flange. Opposite the ring is applied the housing 19 for the brake, the flange 20 thereof receiving the ring 16 in its entrance with a smooth sliding contact. A connection is made between the flange 20 of the housing and the periphery of the ring 16 by the use of pins 21 projecting from the ring, such pins entering diagonal slots 22 cut into the flange from its edge, as clearly shown in Figure 4. This connection enables the housing to move upon and recede from the ring when the housing is given a rotary movement in one or the other direction.

The bolts 15 for the spoke assembly of the wheel also have a function to secure to such assembly a ring 23 as clearly shown in Figure 3. This ring has a reduced boss 24, which is also hollow but whose periphery is not circular like that of the ring but angular, in the present instance being shown square, as clearly indicated in Figure 5. Upon the boss 24 is loosely mounted a steel disk 25, the same being reinforced by smaller disks 26 on each side in the region of the center, and the assembly being cut with a central opening 27. The outer portion of the disk is lined on both sides with rings of friction material 28, such as raybestos, or other compositions suitable for use as a brake lining. The assembly of the disk 25 is intended to float within the housing of the brake; yet, its internal opening 27 is of the same angularity as the contour of the boss 24, so that the disk is non-rotatably connected with the same, yet may freely slide across the surface of the boss.

It will now be seen that a braking action may be exerted upon the wheel by moving the housing 19 in a direction to further receive the pins 21 within the slots 22, this action causing, as previously mentioned, the housing to move upon the base ring 16 and thereby grip the disk assembly 25 between it and such base ring. Since the base ring is stationary because of its rigid connection with the axle 10, and since the housing 19 has but a limited movement relative of the base ring, while the disk assembly 25 is constantly rotating by force of its connection with the moving wheel, it will be seen that the motion of the disk and therefore of the wheel will be arrested suddenly or progressively, in accordance with the degree of movement received by the housing. Thus, the housing is the driving element of the brake, the base ring 16 is the stationary element, and the disk 25 is the affected element thereof.

I have for the present illustrated a fragment 29 of a brake actuating rod as leading to the brake from the pedal or control, which need not be shown. The rod 29 is pivotally connected at 30 to a lug 31 mounted over the housing 19, so that when the rod is drawn forward, the housing will rotate with the effect of closing in on the base ring 16 and effecting a braking action. The lug 31 is not connected directly to the housing 19, however, but carries bolts 32 which first pass through a cover therefor comprising a band 33. The cover snugly encircles the housing 19, and it is split as indicated at 34 to allow for a clamp extension 35 whereby the cover may be tightly drawn upon the housing 19 to keep dust or foreign matter from falling into the slots 22 and impairing the action within the housing. Consequently, the tug of the rod 29 upon the lug 31 will move the housing and accomplish the result described.

While the outer spring on the brake control of the machine effects the return movement of the brake pedal and the brake rod when the pedal has been relieved of foot-pressure, I do not depend entirely upon such return action to release the brake. As clearly illustrated in Figure 1, I apply a series of springs 36a between the housing flange 20 and the base ring 16, hooking the ends of the springs to clips 37 spot-welded to the flange and base ring, respectively. These springs are of the tension variety, and act to reverse the motion of the housing 19 as soon as the forward tug thereon has been released, separating the housing from the base ring and the braking disk 25. Also, I have provided a self-release for the latter in case it should have any tendency to linger in advanced position. This release is represented by a series of arched leaf-springs 38 carried upon the inner end of the boss 24, and directed to press outwardly against the inner face of the friction disk. Thus, as the disk receives a braking impulse its movement toward the base ring 16 momentarily flattens the springs 38, this, however, having no detrimental effect upon the same, since the base ring is recessed as indicated at 16a over a large area to provide clearance for the advance of the springs 38 as induced by the friction disk. However, as soon as the housing 19 recedes and relieves the friction disk of its pressure, the tension of the springs 38 asserts itself by bearing uniformly upon the inner surface of the friction disk to separate the same from the stationary element of the brake, and therefore to prevent the disk from dragging or receiving undue wear. The disk backs against the inner heads 15a of the stay-bolts 15, such heads projecting sufficiently to keep the disk free of the housing 19.

It will be noted that the internal opening of the friction disk is bounded by a crowned or rounded rim 39. This form is given to the rim in order that it may be relieved of jamming influences in cases where the running of the boss 24 would be slightly untrue due to a worm bearing or end play in the wheel. It will be seen that the friction disk will thus have full freedom to perform its action irrespective of imperfections in the performance of the wheel; yet, the angular relation of the friction disk with the wheel makes a positive braking connection, which cannot fail as long as a braking effort is exerted upon the disk.

It will be obvious that my brake continues to function efficiently as wear develops between the engaging surfaces, taking up such wear by a slight extension of its active strokes. This feature deals with the action of the slot and pin connection 22, 21 described; and the slots can be made of such length as to provide for a maximum travel of the disk in the braking direction, so that no mechanical take-up device will be necessary. In other words, when the friction disk has literally worn through its friction elements and the lack of a good braking action or hold is felt, notice will be had by the driver that the brake has brought to an end the useful life of its friction disk, making it necessary to replace the disk. As will be obvious, a replacement of this character would not be a major operation when proper tools are employed, and once the interior of the brake is accessible, the old disk may be replaced with a new one instantly, and the brake when again assembled will be as good as new. Clearly, a long period would pass before a friction disk becomes worn in service, which indicates that a replacement would be very occasional. To prevent the possible recession of the housing 19 out of engagement with the base ring pins 21 one or more of these may be confined in the slot or slots 22 by the barring of the slot entrance with a screw or bolt 40, as clearly shown in Figure 4. As noted, the screw is placed in a position for handy removal in case the brake is to be taken apart.

Owing to the floating nature of the friction disk, its expansion or contraction with climatic changes will not be items of concern as in the case of prevailing brake bands. Sufficient room is provided within the brake chamber for variations of this character, and the brake will always be in a position to exert its full force when required; yet, it will run free and not become an impediment in any manner. Being fully enclosed, the friction disk should operate without noise, especially in view of the fact that lateral vibration thereof would in a great measure be counteracted by the springs 38. In conclusion, the novel brake will be found to be proof to water and dust when properly constructed, so that no internal clogging will occur to retard its proper action. Also, the nature of the parts described enables the brake to be constructed strongly and cheaply, so that a saving in the purchase price as well as in the maintenance cost will result to the owner of the machine.

I claim:—

1. A vehicle brake comprising a stationary plate, a companion plate opposite the same, a rotatable friction disk between the plates, a marginal and diagonally-slotted flange carried by the companion plate, and pins projecting from the stationary plate into the slots of said flange whereby to adapt said companion plate to urge said disk toward the stationary plate with a screw motion.

2. A vehicle brake comprising a stationary plate, a perforated movable plate connected with the latter to advance upon the same with a screw motion, a rotatable element outside the movable plate and having a hub extending through the perforation in the same, a friction disk movable between said plates and operatively mounted on said hub, back-stops for the disk carried by said rotatable element in advance of the retracted position of the movable plate, and springs carried by said hub to urge the disk toward said back-stop, said stationary plate being recessed to accommodate said springs when the disk is caused to advance toward such stationary plate.

In testimony whereof I affix my signature.

NORBERT F. KEMPEL.